United States Patent
Ahern et al.

(10) Patent No.: US 7,346,910 B1
(45) Date of Patent: Mar. 18, 2008

(54) ADMINISTRATION OF GROUPS OF COMPUTER PROGRAMS, DATA PROCESSING SYSTEMS, OR SYSTEM RESOURCES

(75) Inventors: John Edmund Ahern, Stubbington (GB); Keith Andrews, Winchester (GB); Arndt Douglas Eade, Salisbury (GB); Hazel Heather Fix, Chandlers Ford (GB); Paul Kettley, Winchester (GB); Daniel Noel Millwood, Southampton (GB); Sharuff Morsa, Chandlers Ford (GB); Peter Siddall, Romsey (GB)

(73) Assignee: International Business Machines Incorporation, Armonk, NY (US)

( * ) Notice: Subject to any disclaimer, the term of this patent is extended or adjusted under 35 U.S.C. 154(b) by 0 days.

(21) Appl. No.: 09/579,677

(22) Filed: May 26, 2000

(51) Int. Cl.
G06F 9/44 (2006.01)
G06F 17/30 (2006.01)
G06F 9/46 (2006.01)
H04L 9/00 (2006.01)

(52) U.S. Cl. .......................... 719/314; 707/9; 713/165; 726/30; 718/104

(58) Field of Classification Search ........ 709/100–108, 709/312–316, 213–216; 707/100–103, 1–10; 711/147–149; 718/100–108; 719/312–316; 713/164–167, 201; 726/26–30
See application file for complete search history.

(56) References Cited

U.S. PATENT DOCUMENTS 5,222,217 A * 6/1993 Blount et al. ............... 707/204

5,379,430 A 1/1995 Nguyen (Continued)

FOREIGN PATENT DOCUMENTS

EP 575279 12/1993

(Continued)

OTHER PUBLICATIONS

"ZENworks for Desktops 3", Novell, http://www.novell.com/products/zenworks/desktops/details.html, 8 pages.

(Continued)

Primary Examiner—William Thomson
Assistant Examiner—Charles E Anya
(74) Attorney, Agent, or Firm—Jeanine S. Ray; Hoffman, Warnick & D'Alessandro, LLC

(57) ABSTRACT

Provided are a computer program, method and system providing simplified administration of groups of computer programs. Command target qualifiers are defined which enable a command to be targeted at either an individual computer program or all members of a group of computer programs. Additionally, scope parameters are defined which enable a command to be targeted at specific computer system resources managed by the computer programs within the group. The computer system resources which are to be accessible to all members of a group have an associated scope parameter defining shared or group access and are held in shared storage, whereas computer system resources to be accessed by only one computer program in the group have a corresponding scope parameter and are held in the local storage of the individual computer program. The invention enables a reduction of the time taken to perform administration and control operations for the group and reduces the risk of inconsistent specification of commands that can arise when a system administrator is required to repeat entry of a command several times.

4 Claims, 5 Drawing Sheets

U.S. PATENT DOCUMENTS

| | | | |
|---|---|---|---|
| 5,617,570 A * | 4/1997 | Russell et al. | 719/312 |
| 5,649,102 A * | 7/1997 | Yamauchi et al. | 709/213 |
| 5,649,184 A * | 7/1997 | Hayashi et al. | 707/8 |
| 5,706,516 A * | 1/1998 | Chang et al. | 719/314 |
| 5,841,973 A * | 11/1998 | Kessler et al. | 709/250 |
| 5,892,944 A | 4/1999 | Fukumoto et al. | |
| 5,910,178 A * | 6/1999 | Moh et al. | 709/232 |
| 5,956,710 A * | 9/1999 | Yarom | 707/3 |
| 6,058,389 A * | 5/2000 | Chandra et al. | 707/1 |
| 6,141,701 A * | 10/2000 | Whitney | 710/5 |
| 6,148,366 A * | 11/2000 | Watanabe | 711/112 |
| 6,529,932 B1 * | 3/2003 | Dadiomov et al. | 718/101 |

FOREIGN PATENT DOCUMENTS

| | | |
|---|---|---|
| EP | 803808 | 10/1997 |
| EP | 918411 | 5/1999 |
| EP | 978776 | 2/2000 |

OTHER PUBLICATIONS

"ZENworks and the Art of Desktop Management", Novell DevNote, Apr. 1998, 6 pages, http://developer.novell.com/research/devnotes/1998/april/02/dpv.htm.

* cited by examiner

ADMINISTRATION OF GROUPS OF COMPUTER PROGRAMS, DATA PROCESSING SYSTEMS, OR SYSTEM RESOURCES

FIELD OF INVENTION

The present invention relates to management or administration of groups of computer programs or other data processing system resources.

BACKGROUND

It is well known in the art for administration and management of computer system resources to be performed separately for each of the computer systems in a network. This may involve a network administrator physically going to each system, but it is also known for administration functions to be controlled remotely from a single point in the computer network. Even if administration functions are controlled remotely, the administrator will typically interact with each system from the remote point of control independently of the other systems.

RELATED APPLICATIONS

European Patent Application EP-A-0803808 discloses administering a network server from a remote location, but there is no disclosure of simultaneous administration of groups of computer system resources.

European Patent Application EP-A-0918411 discloses a network administrator simultaneously and remotely configuring a group of network devices ("batch configuration"), from a single controlling host system. Although it is noted in EP-A-0918411 that a number of different criteria can be used to select network devices to be configured, there is no description of any specific selection mechanism other than an interface enabling the administrator to receive information and to select a set of devices and parameters to be changed. Having made the selections, the network administrator changes certain parameter settings using one operation for the set of selected devices and initiates a reconfiguration sequence.

European Patent Application EP-A-0575279 discloses distributed control over groups of users in a multicast network by providing at each node in the network the capability for creation, administration and control over user groups. Although EP-A-0575279 discloses controlling user groups for multicast communications from any node, this is stated to be handled separately from administration and control of communication paths and there is no disclosure of distributed control of administration of computer system resources.

There remains a need for simplified administration of data processing resources, particularly in the context of control or administration of a group of cooperating computer programs where the programs may be performing very similar or identical functions in respect of a shared resource. Some administration functions will need to be performed consistently for all of the programs in a group, whereas other administrative functions will need to be performed for only one of the group's program only.

SUMMARY OF INVENTION

The present invention provides methods, computer programs and apparatus for simplifying the administration of groups of computer programs or computer system resources. The invention allows commands to be easily targeted at specific groups of programs or other system resources, certain of which are held in shared storage areas to enable access by each member of a group of computer programs. The invention enables a reduction of the time taken to perform administration and control operations for the group and reduces the risk of inconsistent specification of commands that can arise when a system administrator is required to repeat entry of a command several times.

In a first aspect, the present invention provides a method for simplifying control of a group of computer programs which access computer system resources held in computer system memory, the method including the steps of:

providing connection services to each computer program within the group of computer programs to enable access to a shared access memory;

providing a set of command target qualifiers including at least one command target qualifier indicating that a command should be applied to all members of a group of computer programs; and providing a set of scope definitions for association with respective computer system resources to determine the scope of access and change rights for the computer system resources and for determining whether the computer system resources should be stored in said shared access memory, and for identifying computer system resources to which a command is to be applied by reference to their associated scope definitions.

In a preferred implementation of the invention, commands for performing operations on any one or all of the members of a group of associated computer programs can be initiated at any one of the computer programs in the group. This distribution of operation control (or "floating point of control") enables greater operator efficiency and provides more reliable availability than many solutions which are reliant on a single fixed point of control.

The invention has particular applicability for administration of communication manager programs within a group of cooperating communication managers. For example, a group of communication manager programs may be identical replicas of each other or, whether identical or not, may be interconnected to enable close cooperation to perform a common task such as delivery of large numbers of messages. The group of cooperating communication managers can achieve high capacity and availability and therefore high performance. Load balancing and recovery failure features may be implemented by the group. Since such a group will perform similar or identical tasks in respect of shared resources (as well as unshared but similar resources), the same administrative operations will often be required for all communication managers in the group. The present invention facilitates targeting of commands both at groups of communication managers and at individual communication managers as required, and preferably allows commands to be initiated from any member of the group regardless of which of the communication managers are to be controlled by the command.

In a computer network in which communication manager programs use messaging and queuing to transfer messages between application programs, a set of queue manager programs may all have access to a shared message queue to enable parallel processing of messages by application programs connected to any one of the set of queue managers. This can provide high capacity and availability and hence improve overall system performance. In such circumstances, it will be desirable to perform certain administration functions for the whole set of queue managers without having to initiate the same function separately for each of the queue managers. This would not only save time, but also avoid the potential for inconsistent and erroneous administration of the queue managers within a group.

Other administration functions will be required to be performed on one queue manager only, and this may be either the Queue Manager via which the function was initiated or it may be another Queue Manager within the same group. The ability to initiate commands from any member of the group and to perform operations on behalf of each other would reduce the risk associated with failure of any one Queue Manager and simplifies administration.

The present invention addresses these requirements by providing mechanisms enabling targeting of commands such as administration commands at particular sets of Queue Managers or objects managed by Queue Managers. A set of object scope definitions are provided and utilized when new objects are defined (created) to determine the scope of access and change rights to the object—for example, whether it is a shared object or is accessible by only one Queue Manager. The newly defined object is then placed either in shared-access storage or unshared local storage, depending on the particular object's access scope. For example, if an application is to run on any Queue Manager within a group, then the definitions of the resources (e.g. queues) required by the application need to be available to all Queue Managers in the group. In this case, the respective queue definition objects will be placed in shared-access storage. Additionally, a set of command target qualifiers are provided which, together with the scope definitions, enable an administrator to select a desired scope of applicability for a command such as an administration operation command.

BRIEF DESCRIPTION OF DRAWINGS

Embodiments of the invention will now be described in more detail, by way of example only, with reference to the accompanying drawings in which.

DETAILED DESCRIPTION OF PREFERRED EMBODIMENTS

Figure 1:
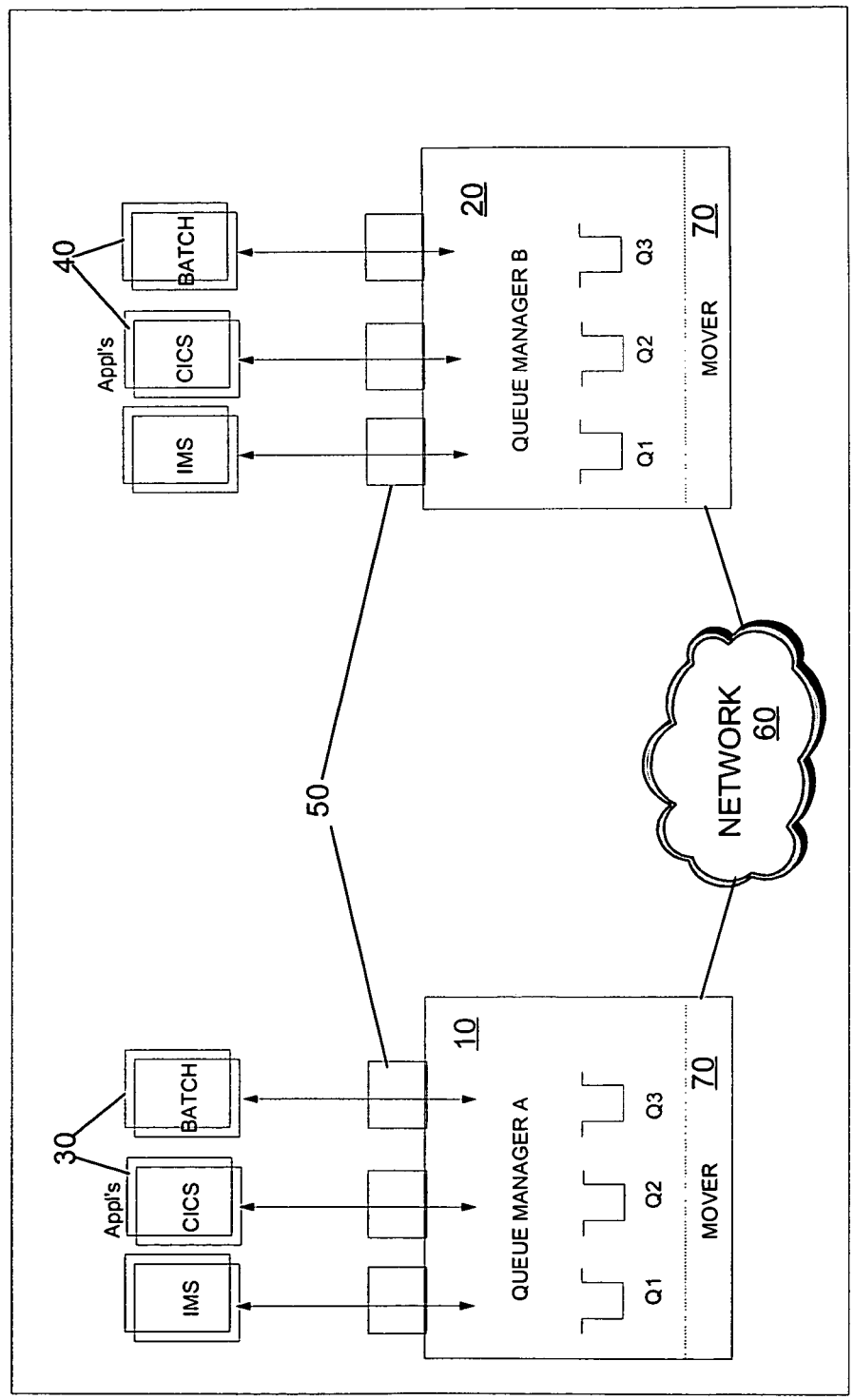
FIG. 1 is a schematic representation of two Queue Managers according to the prior art.

An embodiment of the invention will now be described in the context of a data processing and communications network in which a plurality of communication managers and their connected application programs are arranged in a cluster or parallel sysplex and have shared access to certain data processing system resources.

Application programs running on different computers within the network are enabled to communicate and hence interoperate using communications manager products such as IBM Corporation's MQSeries message queuing software products. Message queuing and commercially available message queuing products are described in "*Messaging and Queuing Using the MQI*", B. Blakeley, H. Harris & R. Lewis, McGraw-Hill, 1994, and in the following publications which are available from IBM Corporation: "*An Introduction to Messaging and Queuing*" (IBM Document number GC33-0805-00) and "*MQSeries—Message Queue Interface Technical Reference*" (IBM Document number SC33-0850-01). The network via which the computers communicate using message queuing may be the Internet, an intranet, or any heterogeneous or homogeneous data processing network. (IBM and MQSeries are trademarks of IBM Corporation.)

IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328, which are incorporated herein by reference.

The message queuing inter-program communication support provided by the MQSeries products enables each application program to send messages to the input queue of any other target application program and each target application can asynchronously take these messages from its input queue for processing. The communication manager component which manages queues and provides services for the assured delivery of messages between application programs, including achieving interoperability between applications in a distributed heterogeneous network, is known as a Queue Manager. The component which handles transfer of a message from an outgoing transmission queue of a sender Queue Manager across the network to an input queue of a receiver Queue Manager is known as a mover.

IBM Corporation's MQSeries product family include Queue Manager programs for a large number of different operating system and hardware platform environments, providing the messaging and queuing services to application programs through its Message Queue Interface (MQI) program calls.

In IBM's OS/390 operating system environment, application programs connect to a given Queue Manager through an adapter (for example, the MQI call MQCONN for establishing a connection of an application to a Queue Manager will be sent from the application-hosting environment via an adapter). The adapter that is used depends on the type of application program. For example, an application program written for IBM's CICS transaction server product would connect through the CICS Adapter. (CICS and OS/390 are trademarks of IBM Corporation).

FIG. 1 shows a conventional network configuration in which two individual Queue Managers 10,20 each have local queues Q1, Q2 and Q3 defined to them. Each Queue Manager is responsible for managing all aspects of the queues it owns, including the data on those queues, along with any other MQSeries objects defined to that Queue Manager. Such other objects may be channel definitions, name list definitions, process definitions, storage class definitions, etc.

Queue Manager A can only access and change definitions relating to the objects it owns, and Queue Manager B can only access and change definitions relating to the objects it owns.

Each Queue Manager also has applications 30,40 connecting to it via the different adapters 50. The applications can only access data on queues owned by the respective Queue Manager which each of them is connected to. The Queue Manager's transfer messages via network 60 using their mover components 70.

In such an environment, where interoperating Queue Managers each have sole responsibility for their respective queues and other resources and applications communicate via a single Queue Manager, it is conventional to perform administrative operations separately for each Queue Manager even if the administrative functions are initiated from a computer system which is remote from the system on which the Queue Manager is installed. The administrative operations are initiated by issuing commands via a respective Queue Manager's command interface. This does not introduce significant inefficiencies since the required administrative operations will typically be different for the different Queue Managers.

However, there are circumstances in which significant inefficiencies result from only a single Queue Manager being able to access a given input queue and to change its definitions. For example, if message throughput exceeds a certain level, then an individual Queue Manager may be unable to handle the number of messages with an acceptable performance. In such circumstances it is appropriate to configure the network such that a group of Queue Managers have shared access to certain queues. Application programs connected to any one of the group of Queue Managers can then share the message workload, processing messages in parallel, and thereby improving performance. The workload is automatically balanced between these applications because of the message retrieval policy implemented by messaging and queueing techniques, in which each application gets messages when it is ready. The least constrained application instance will therefore retrieve and process the most messages. In addition to the increased capacity to handle message flows, provision of a group of cooperating Queue Managers achieves higher availability—reducing the potential for failure of an individual Queue Manager to result in communication delays.

A group of Queue Managers that can interact with and closely cooperate with each other to manage certain shared queues and other system resources is known as a Queue Sharing Group. Each Queue Manager in such a group is still responsible for the local resources that it owns but now it has a 'shared' responsibility with the other Queue managers within the Queue Sharing group for additional Shared resources to which it has access.

Figure 2:
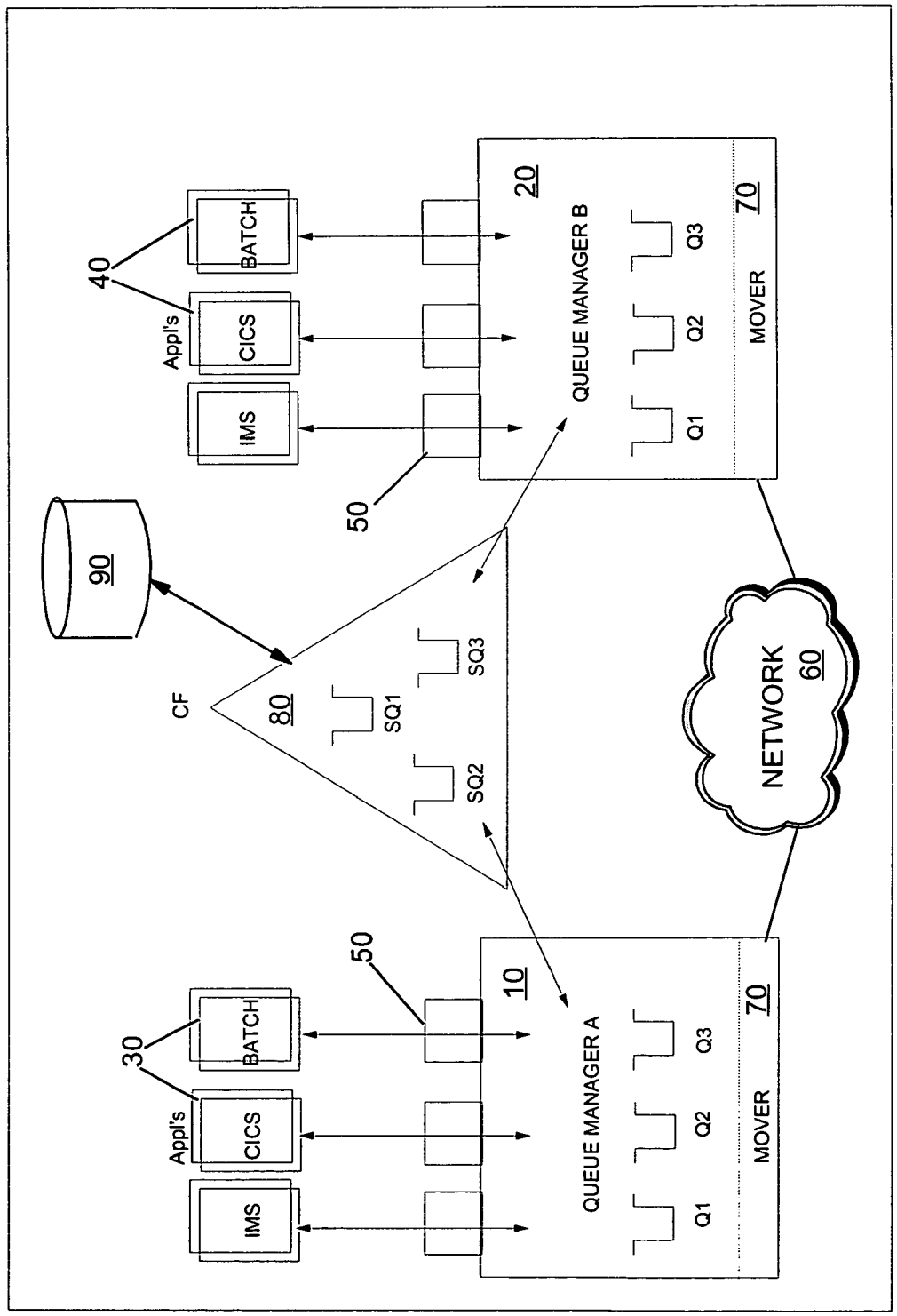
FIG. 2 shows two queue managers such as in FIG. 1 with the addition of a coupling facility according to a first embodiment of the invention.

FIG. 2 shows the two Queue Managers of FIG. 1 with the addition of a Coupling Facility 80 which holds messages on Shared queues and provides messaging services for accessing these queues. The Coupling Facility comprises a microprocessor unit and data list structure and is connected to a shared data repository 90 holding Shared Queue definitions. When in use, the Coupling Facility also holds a representation of the Shared Queue definitions, but the primary copy of static definitions resides in the data repository 90.

The data repository and Coupling Facility are accessible from all of the Queue Managers in the Queue Sharing Group. The shared repository is preferably a data sharing DB2 database (DB2 is a trademark of IBM Corporation). High bandwidth fiber optic links, called coupling facility channels, provide high speed connectivity between the Coupling Facility and systems directly connected to it. Each Queue Manager includes a Coupling Facility Manager component which uses published interfaces to provide connection services for connecting to the coupling facility list structures (to perform operations on list structure entries such as read, write, delete, connect, disconnect, update and move). The Coupling Facility Manager component handles all requests to the Coupling Facility with appropriate levels of concurrency, serialisation and integrity. A DB2 Manager component controls requests to the DB2 database, including initiating connect and disconnect from the database and accessing DB2 objects using SQL-based read, write, delete and update services.

A Queue Manager is specified to be a member of a Queue Sharing Group upon startup of the Queue Manager, and this determines whether the Queue Manager will have access to the Coupling Facility list structures.

Administration within a Queue Sharing Group:

If we consider that Queue Managers which are a part of the same Queue Sharing Group are closely cooperating, and may be logical clones of each other, they typically host similar sets of local resources and also have access to the same set of shared resources. We can also assume that, if administration functions related to shared resources are performed on one of a set of "cloned" Queue Managers, it is highly likely that the same function will need to be performed on the other "cloned" Queue Managers. Indeed, unless administrative functions are performed consistently for all members of a Queue Sharing Group, it is likely that one member will not perform one of the group's operations correctly.

An administrator wishing to perform functions (for example: DEFINE, ALTER, REFRESH, DELETE or DISPLAY) against locally based resources on each Queue Manager conventionally had to issue the same command via a command interface on each of the cloned Queue Managers, since there was no method to perform administrative functions against a group of Queue Managers. This is an inefficient use of the administrator's time, but it also risks problems if the administrator is not rigorous in ensuring consistent administration of all Queue Managers in the Queue Sharing Group.

The present invention provides enhancements in support of Queue Sharing Groups including allowing administration to be performed on a group of Queue Managers as well as at the level of individual Queue Managers.

Figure 3:
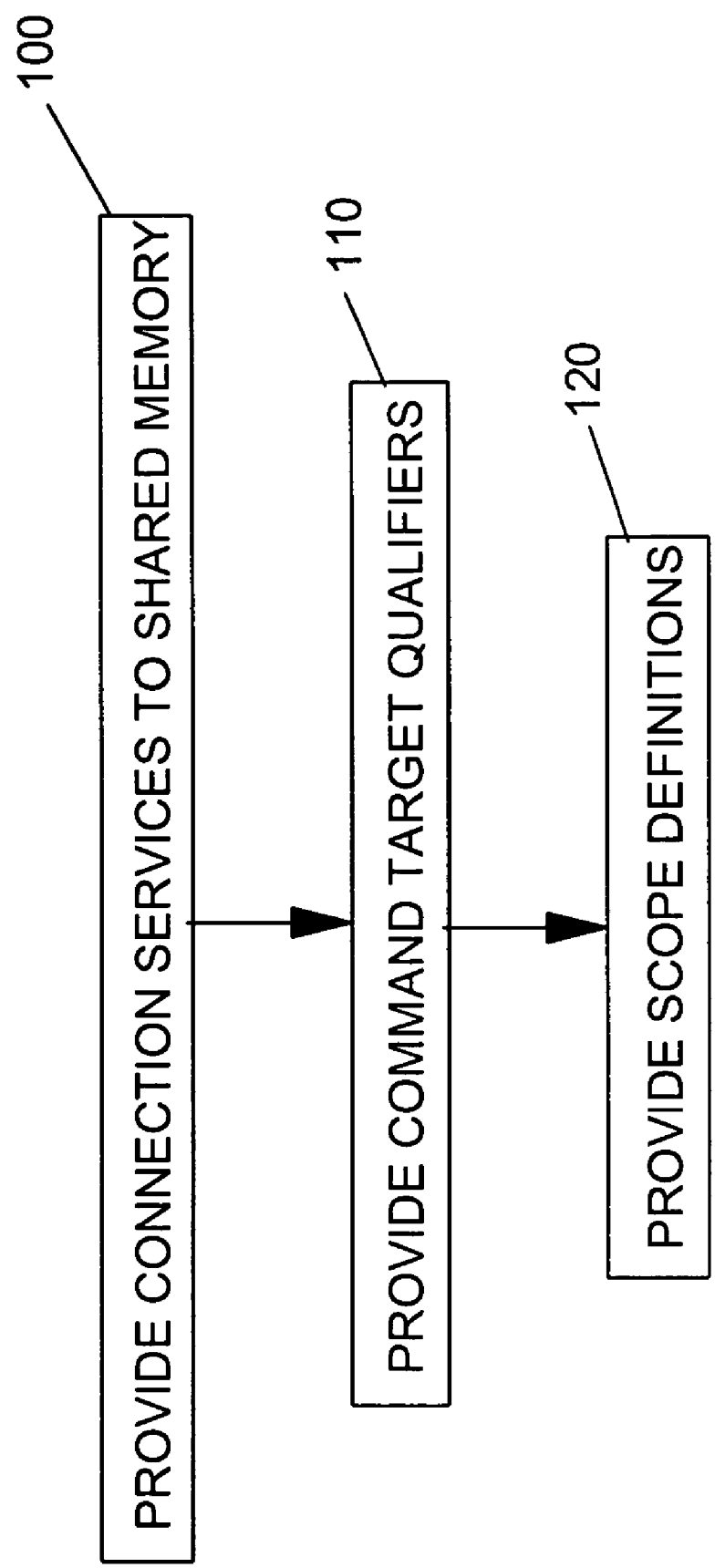
FIG. 3 is schematic representation of the steps of a method of providing administration capability according to an embodiment of the invention.

FIG. 3 shows the steps of providing features for implementing the invention including providing the connection services 100 for accessing shared memory, and providing command target qualifiers and scope definitions 120 for controlling the scope of applicability of a command.

Firstly, a set of object scope options have been defined 120 for objects which are accessible by one or more of the Queue Managers within a Queue Sharing Group. The scope option set for an object represents the access rights and rights to change the object's parameters (e.g. determining whether the object is a shared object or is specific to an individual Queue Manager). The scope parameter of an object determines where the object definition will be held in order to facilitate the desired access and change rights (i.e. determining whether an object is held in shared access storage or in local storage of the responsible individual Queue Manager). New instances of objects will be defined when, for example, a new application program requires a new set of resources and the scope parameter will be set when the new object is defined. The requirements of the application indicate what type of object definition will be required. Examples of types of object include message queues and process definitions.

Setting of the scope parameter during object creation thus controls the process of saving the object to storage—automatically determining where the object is held. If the application program could potentially run on any of the Queue Managers of the Queue Sharing Group then the definitions should be made available to all of the Queue Sharing Group. This level of availability can be achieved by the use of objects of scope Group (see below), or if the application requires truly shared queues and hence shared messages then queues with scope Shared should be defined. When a Group scope option is specified, this determines that copy objects will be created in local storage of the active Queue Managers within the Queue Sharing Group—automatically triggering the generation of copy objects.

If the application only needs to run on a single Queue Manager within the Queue Sharing Group then the definitions should be made available to only that Queue Manager. This level of availability can be achieved by the use of objects of scope Queue Manager. The object scope options which are available for use by the Queue Managers within a queue sharing group are:

Scope of Queue Manager
  The definition of an MQSeries Queue Manager object is stored locally in the local system storage files of the Queue Manager where the DEFINE operation was performed (i.e. A DEFINE command for an object which specifies scope Queue Manager will initiate processing that will cause a Data Manager component of the Queue Manager to write the object to the pageset zero of the Queue Manager). This Queue Manager based object is not available to any other Queue Manager within the Queue Sharing Group.

Scope of Group
  The definition of an MQSeries Group object is stored in a central repository (accessible via the Coupling Facility) by the Queue Manager that processes the DEFINE of the Group object. In particular, the DEFINE command will initiate processing that will write the object to a Data Sharing DB2 database, under the control of a DB2 Manager component of the Queue Manager. The Group object is available to all other active Queue Managers within the Queue Sharing Group. A Group object may be a message queue, but it is not limited to queues (it may be a storage class definition object, channel definition object, name list definition object, process definition object, etc).
  The definition of the Group object initiates each Queue Manager in the Queue Sharing Group to create a local COPY of the group object using the Group object as a model. The Copy object resides on pageset zero of each of the Queue Managers in the Queue Sharing Group.

Scope of Copy
  The definition of the MQSeries Copy object is as a result of the definition of an MQSeries Group object. The Copy object is a copy of the Group object. The Copy object has the same access scope as the Queue Manager object and so is not available to any other Queue Manager within the Queue Sharing Group.

Scope of Shared
  The definition of an MQSeries Shared Object is stored in a shared access repository by the Queue Manager that processes the DEFINE of the Shared object. The DEFINE operation initiates processing that writes the object to a Data Sharing DB2 database under the control of the DB2 Manager component of the Queue Manager. The Shared object is available to all other active Queue Managers within the Queue Sharing Group. Shared objects are not replicated to the locally held pagesets of the Queue Managers in the Queue Sharing Group. A Shared object is typically a shared message queue. Messages on the shared queue will be available for any Queue Manager in the Queue Sharing Group to access, but once retrieved by a Queue Manager will be unavailable for retrieval by any other unless the first retrieval operation is rolled back.

Figure 4:
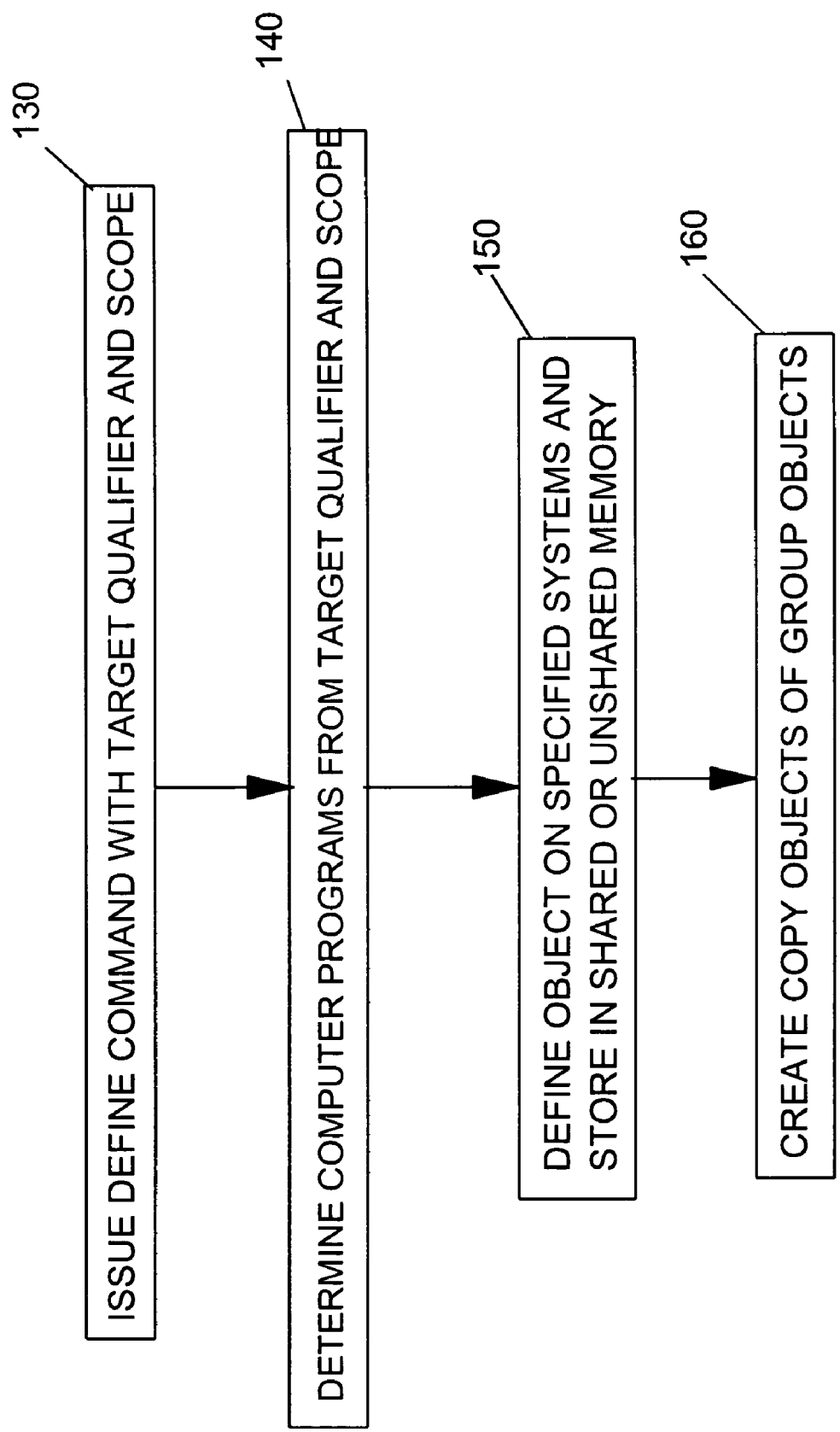
FIG. 4 is a schematic representation of the steps of a define operation according to the invention.

FIG. 4 shows the steps performed in response to a define operation 130 which specifies a target qualifier and scope definition, including determining the target computer programs and storage location 140, defining the objects and storing in the determined storage location 150, and creating copy objects as required 160.

In addition to use of the scope parameter when creating an object, the scope parameter is also used when a subsequent command is issued 170 to specify which particular object or set of objects is to be targeted by the command. For example, if a command is to apply to all Shared objects of a certain object type (e.g. Shared queues) but not to Queue Manager objects of the same type (e.g. local queues), then the object type and a scope of Shared can be specified as parameters of the command (while avoiding the need to specify all the objects of this type by name). Examples will be described later.

Secondly, a set of command target qualifiers has been defined 110 to allow commands to be targeted at Queue Managers within a Queue Sharing Group, without the need for the channel communication which is required for communication between Queue Managers which are not in the same group.

Without Queue Sharing Groups, all communication of commands between Queue Managers would involve putting of a command within a message, establishing a communication channel between the Queue Managers, and sending the message across the channel to the recipient Queue Manager. The recipient Queue Manager will put the message on a specialized command input queue for retrieval and processing. The overhead inherent in this process can be reduced using Queue Sharing Groups by targeting a command directly at a shared object in the shared repository of the Coupling Facility.

The defined set of command target qualifiers are:

TARGET_QUALIFIER Not Specified
  The command is executed only on the queue manager where the command is issued.

TARGET_QUALIFIER (Queue Manager Name)
  The command is executed on the queue manager specified, providing that it is either the local Queue Manager or is another Queue Manager which is active within the queue sharing group.

TARGET_QUALIFIER (*)
  The command is executed on the local queue manager, and is also passed to every active queue manager within the queue sharing group giving the same effect as if the command had been entered on each queue manager within the queue sharing group. All responses to the command are returned to the originating Queue Manager.

These options for targeting commands can be thought of as allowing an administrator to issue commands in the following modes:

'here' run on the local Queue Manager where the command is executing.

'there' run on the Queue Manager specified as a part of the command.

'everywhere' run on all active Queue Managers within the Queue Sharing group.

The combination of these scope-defining objects and the ability to target commands gives the following possibilities:

Object with SCOPE "shared"—A single command can update a shared object and all members of the Queue Sharing Group will automatically be informed of the changes.

Object with SCOPE "group"—A single command can update a group object. The update to the group object is used to update the copy objects which were created on every member of the Queue Sharing Group, and this happens automatically.

Object with SCOPE "copy" with target qualifier (Queue Manager Name)—A single command updates the copy object on a single Queue Manager.

Object with SCOPE "copy" with target qualifier (*)—A single command updates all copy objects on active Queue Mangers within the Queue Sharing Group.

Object with SCOPE "queue manager" with target qualifier (Queue Manager Name)—A single command updates the Queue Manager object on a single Queue Manager.

Object with SCOPE "queue manager" with target (*)—A single command updates all Queue Manager objects on active Queue Mangers within the Queue Sharing Group.

Figure 5:
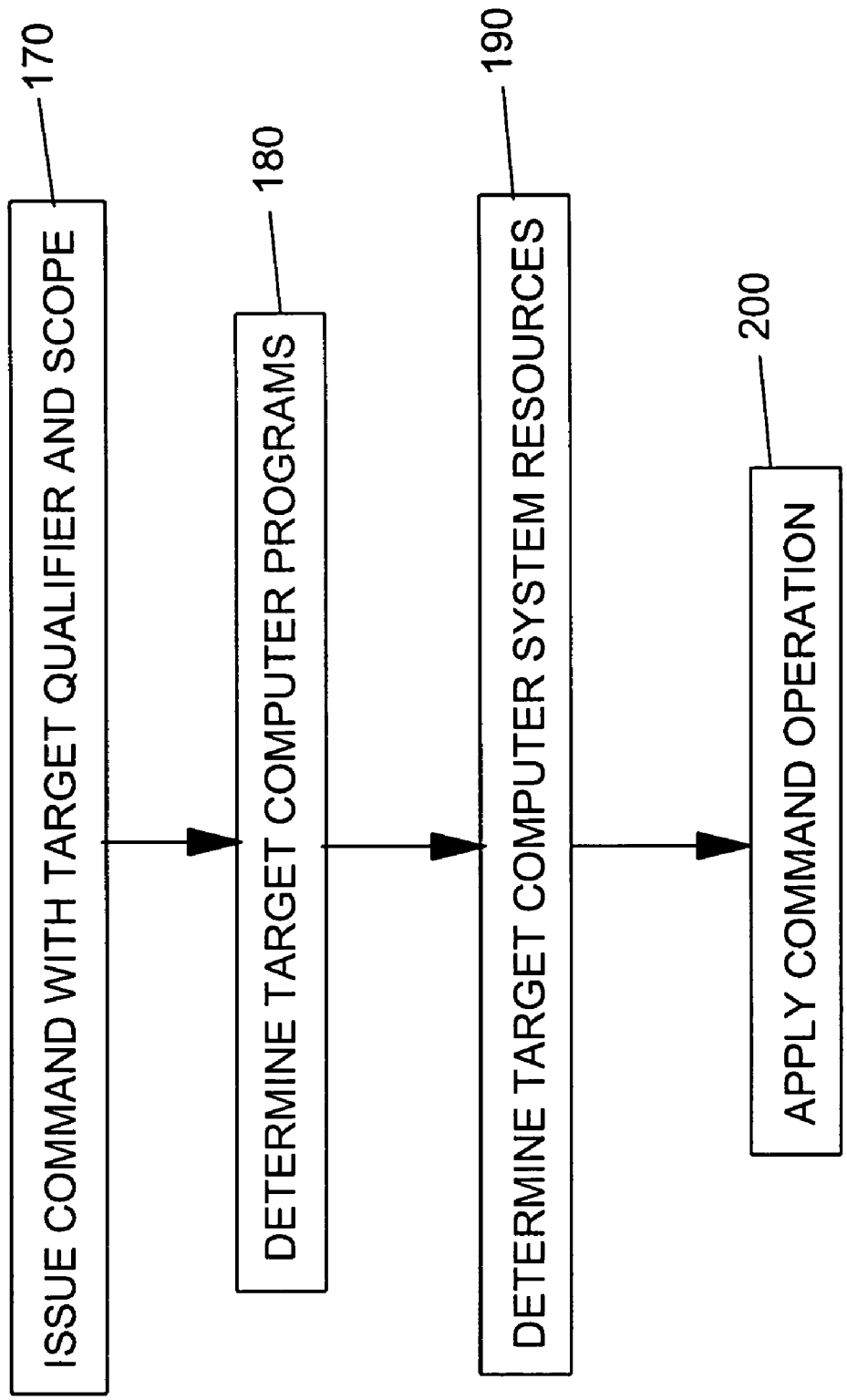
FIG. 5 is a schematic representation of the steps of an operation in response to a command issued for defined computer system resources.

Referring to FIG. 5, program code responsive to an issued command interprets the specified target qualifier and scope definition to determine 180 the target computer programs within the group and to determine 190 the target computer system resources. The command operation is then applied 200.

The following are specific examples of use of the scope parameter on commands to identify the exact object or set of objects that are targeted by the command.

The following command is issued on Queue Manager QM1:

DEFINE PROCESS (FRED) TARGET_QUALIFIER( ) SCOPE(GROUP)

the target qualifier is null so this command is executed on the same Queue Manager that initiated the command (QM1).

The GROUP version of FRED is created and written to the DB2 database

A COPY object is created in every Queue Manager in the Queue Sharing Group, using the group object as the model for the creation of the copy.

It will be useful to consider what definitions of a process called FRED QM1 has access to. QM1 can access the GROUP version of FRED and the COPY version of FRED. If a command is issued that needs to alter/delete/display a specific version of FRED then we need to qualify the command accordingly. Some examples:

1) Example A

ALTER PROCESS(FRED) TARGET_QUALIFIER( ) SCOPE(COPY) DESCR('ALTER COPY—ONLY ON THIS QUEUE MANAGER')

the target qualifier is null, and so the command only alters the COPY version on the Queue Manager where the command is entered.

2) Example B

DISPLAY PROCESS(FRED) TARGET_QUALIFIER( ) SCOPE(COPY)

target qualifier is null, so the command only displays the COPY version for the Queue Manager where the command is entered.

3) Example C

ALTER PROCESS(FRED) TARGET_QUALIFIER(*) SCOPE(COPY) DESCR('ALTER COPY—ON ALL QUEUE MANAGERS')

target qualifier is *, so this command alters the COPY version on all Queue Managers in the Queue Sharing Group Queue Managers in a Queue Sharing Group provide recovery facilities for shared queues such that any Queue Manager in a Queue Sharing Group is able to recover critical system resources to a consistent state following a failure of another Queue Manager in the group.

Furthermore, when a Queue Manager which suffered a failure is restarted, the Queue Manager refreshes itself by implementing Group and Shared commands that were invoked since the failure. This resynchronizing with other Queue Managers in the Queue Sharing Group involves accessing the shared repository, comparing objects stored there with what is available on the local Queue Manager, and obtaining Copy objects corresponding to the latest Group objects or deleting Copy objects if the corresponding Group object has been deleted.

The distributed control over administration tasks (i.e. the ability to initiate operations from any Queue Manager in a Queue Sharing Group) provides flexibility of use for the administrator and reduces the exposure to failure of any individual Queue Manager compared with a solution that relies on a fixed single point of control. Any individual command can be thought of as having been initiated from a single point of control to which all corresponding results and acknowledgements will be returned, but the point of control will change for different commands initiated at different times.

The following are some examples which demonstrate the efficiency improvements achievable by use of the group command concepts:

1) Example 1

1.1) Without Queue Sharing Group Command Support

In this example, an MQSeries parallel sysplex contains 10 cloned Queue Managers called QM1, QM2 through to QM10. If an administrator wished to define an identical process definition object on all 10 of the Queue Managers then the command would have to be issued 10 times, once on each Queue Manager:

DEFINE PROCESS (P1)—command issued on QM1

DEFINE PROCESS (P1)—command issued on QM2

DEFINE PROCESS (P1)—command issued on QM3

DEFINE PROCESS (P1)—command issued on QM4

DEFINE PROCESS (P1)—command issued on QM5

DEFINE PROCESS (P1)—command issued on QM6

DEFINE PROCESS (P1)—command issued on QM7

DEFINE PROCESS (P1)—command issued on QM8

DEFINE PROCESS (P1)—command issued on QM9

DEFINE PROCESS (P1)—command issued on QM10

Each issued command activates operations only on the individual Queue Manager on which it was issued.

A process definition object is typically used by application programs for determining what particular sequence of process operations should be triggered in response to an event. For example, when a message arrives on a queue, a process definition object may be referred to determine issues such as what back-end application processing to invoke. In response to certain trigger events, a process definition object may instruct starting of instances of an application to run on any or all Queue Managers in a Queue Sharing Group.

1.2) With Group Command Support According to an Embodiment of the Invention

A Queue Sharing Group QSG1 contains 10 cloned Queue Managers called QM1, QM2 through to QM10. Now, if an administrator wished to define an identical process definition object on all 10 of the Queue Managers within the Queue Sharing Group then this can be performed with a single command from any Queue Manager within the Queue Sharing Group:

DEFINE PROCESS (P1) SCOPE(Queue Manager) TARGET_QUALIFIER(*)—command issued on QM1 and any other active Queue Manager within the Queue Sharing Group to define a process with scope Queue Manager.

All responses are returned to the Queue Manager that initiates the command.

2) Example 2

2.1) Without Queue Sharing Group Command Support

An MQSeries sysplex contains 10 cloned Queue Managers called QM1, QM2 through to QM10. If an administrator wished to define an identical process object on all 10 of the Queue Managers then the command would have to be issued 10 times, once on each Queue Manager.

DEFINE PROCESS (P1)—command issued on QM1

DEFINE PROCESS (P1)—command issued on QM2

DEFINE PROCESS (P1)—command issued on QM3

DEFINE PROCESS (P1)—command issued on QM4

DEFINE PROCESS (P1)—command issued on QM5

DEFINE PROCESS (P1)—command issued on QM6

DEFINE PROCESS (P1)—command issued on QM7

DEFINE PROCESS (P1)—command issued on QM8

DEFINE PROCESS (P1)—command issued on QM9

DEFINE PROCESS (P1)—command issued on QM10

2.2) With Queue Sharing Group Command Support

Queue Sharing Group QSG 1 contains 10 cloned Queue Managers called QM1, QM2 through to QM10. If an administrator wished to define an identical process object on all 10 of the Queue Managers within the Queue Sharing Group then this can be performed with a single command from any Queue Manager (for example QM1) within the Queue Sharing Group:

DEFINE PROCESS (P1) SCOPE(GROUP)—command issued once on either QM1 or any other active Queue Manager within the Queue Sharing Group. This results in queue managers QM1 through to QM10 being informed to initiate a DEFINE of a Copy object process (P1) based on the attributes of the Group object process (P1). This has the same result as if each Queue Manager issued the command:

DEFINE PROCESS (P1) SCOPE(Queue Manager)

It will be clear to persons skilled in the art that the invention according to the preferred embodiment provides simplified and more efficient administration of groups of computer programs or other computer system resources by:

1. enabling a scope of applicability of a command to be easily set by provision of a set of command target qualifiers;

2. enabling computer system resource definitions to incorporate scope parameters determining whether the object should be held in shared on unshared storage and determining whether copies of the object should be made—by provision of shared and unshared storage, provision of a set of object scope options, and provision of processes responsive to the object scope;

3. providing distributed command control, where each Queue Manager in a Queue sharing Group can be a point of control for an administration or other command, regardless of whether the operation corresponding to the command is to be run locally, remotely, or throughout the group.

What is claimed is:

1. A command interface for a computer program stored on a computer readable medium for issuing commands for administration of the computer program and other computer programs which have been defined as a group of computer programs within a group of cooperating communication managers, the command interface providing a set of commands having the following parameters:

a command target qualifier, wherein particular parameter values of the command target qualifier determine which group of cooperating communication managers and which communication managers of the group of cooperating communication managers to which the command should be targeted; and a scope definition, wherein particular parameter values of the scope definition are associatable with respective computer system resources of the computer program that are used in processing of data, and wherein a parameter value of the scope definition determines which of the respective computer system resources the command should be applied to by reference to their associated command target qualifier parameter values, wherein the set of commands includes a define command for defining a new computer system resource, wherein a scope definition parameter value specified in said define command is associated with said computer system resource in response to issuing the command and wherein the scope definition parameter value determines the scope of access and change rights for the computer system resource and determines whether the computer system resource should be stored in a shared access memory which is accessible by all cooperating communication managers in said group of cooperating communication managers or should be stored in unshared local memory of an individual cooperating communication manager indicated by said command target qualifier, and wherein the cooperating communication managers are queue managers, and wherein the computer program is a queue.

2. A command interface according to claim 1, wherein said command target qualifier has at least a first specifiable parameter value indicating that a single command should be applied to all members of the group of cooperating communication managers and a second specifiable parameter value indicating that a command should be targeted to an individual cooperating communication manager of the group of cooperating communication managers.

3. A data processing system including:
   at least one computer program defined as a member of a group of computer programs within a group of cooperating communication managers;
   a command interface for issuing commands for administration of the at least one computer program and other members of the group of computer programs, wherein the command interface provides a set of commands having the following parameters:
   a command target qualifier, wherein particular parameter values of the command target qualifier determine which group of cooperating communication managers and which cooperating communication managers of the group to which the command should be targeted;
   a scope definition, wherein particular parameter values of the scope definition are associatable with respective computer system resources of the at least one computer program that are used in processing of data for communicating among application programs, and wherein a scope definition parameter value specified in a command determines which of the respective computer system resources the command should be applied to by reference to the computer system resources' associated command target qualifier parameter values;
   means for accessing a first memory from one of the group of cooperating communication managers, which first memory is inaccessible from other members of the group of cooperating communication managers; and
   means for accessing a second memory from said one of the group of cooperating communication managers, which second memory is accessible from all members of the group of cooperating communication managers;
   wherein the set of commands includes a define command for defining a new computer system resource, wherein a scope definition parameter value specified in said define command is associated with said computer system resource in response to issuing the command and wherein the scope definition parameter value determines the scope of access and change rights for the computer system resource including determining whether the computer system resource should be stored in said second memory which is accessible by all cooperating communication managers of said group of cooperating communication managers or should be stored in unshared memory of an individual cooperating communication manager indicated by said command target qualifier, and wherein the cooperating communication managers are queue managers, and wherein the at least one computer program is a queue.

4. A method for controlling a group of computer programs within a group of cooperating communication managers which access computer system resources held in computer system memory, the method including the steps of:
   in response to a command being issued which specifies an operation and a command target qualifier, determining which cooperating communication managers within said group of cooperating communication managers to which the command should be targeted;
   in response to the command specifying a scope definition, determining which computer system resources of the determined computer programs the operation is to be performed on, wherein the system resources are used by the determined computer programs to process data for communicating among application programs;
   performing the operation on the determined resources of the determined computer programs;
   in response to a define command being issued which specifies a define operation for defining a computer system resource and which specifies a command target qualifier, determining which cooperating communication managers within said group of cooperating communication managers to which the define operation should be targeted; and
   in response to the define command specifying a scope definition, performing the define operation and associating the specified scope definition with the computer system resource, thereby to determine the scope of access and change rights for the computer system resources and to determine whether the computer system resources should be stored in shared access that is accessible to each of the group of cooperating communication managers or in unshared memory, and storing said computer system resource in said determined memory,
   wherein the cooperating communication managers are queue managers, and wherein the determined computer programs are queues.

* * * * *